United States Patent
Desai et al.

(10) Patent No.: US 10,334,623 B2
(45) Date of Patent: Jun. 25, 2019

(54) METHOD OF MANAGING GRANT OF RESOURCES TO PLURALITY OF USER EQUIPMENTS IN WIRELESS COMMUNICATION NETWORK

(71) Applicant: Octasic, Inc, Montreal (CA)

(72) Inventors: Venkatesh Anantrao Desai, Bangalore (IN); Shashi Kiran Rao Soogoori, Bangalore (IN)

(73) Assignee: OCTASiC, INC., Montreal, Quebec (CA)

( * ) Notice: Subject to any disclaimer, the term of this patent is extended or adjusted under 35 U.S.C. 154(b) by 166 days.

(21) Appl. No.: 15/152,410

(22) Filed: May 11, 2016

(65) Prior Publication Data

US 2017/0257882 A1    Sep. 7, 2017

(30) Foreign Application Priority Data

Mar. 4, 2016    (IN) .............................. 201641007735

(51) Int. Cl.
  *H04W 72/14*    (2009.01)
  *H04W 72/04*    (2009.01)
  *H04W 88/02*    (2009.01)
(52) U.S. Cl.
  CPC ............ *H04W 72/14* (2013.01); *H04W 72/04* (2013.01); *H04W 88/02* (2013.01)
(58) Field of Classification Search
  CPC ......... H04W 72/0413; H04W 72/1284; H04W 72/04; H04W 72/12; H04W 72/1268; H04W 72/14; H04W 88/02; H04L 5/0053; H04L 5/0023
  See application file for complete search history.

(56) References Cited

U.S. PATENT DOCUMENTS

| | | | |
|---|---|---|---|
| 2008/0070603 A1* | 3/2008 | Mao ........................ | H04L 12/14 455/466 |
| 2009/0097444 A1* | 4/2009 | Lohr ..................... | H04W 72/14 370/329 |
| 2010/0197313 A1* | 8/2010 | Suronen .............. | H04W 72/042 455/450 |
| 2011/0044192 A1* | 2/2011 | Wang ................ | H04W 72/1221 370/252 |
| 2011/0141952 A1* | 6/2011 | Wang .................... | H04L 1/1812 370/294 |
| 2012/0115522 A1* | 5/2012 | Nama ............... | H04W 72/0473 455/501 |
| 2012/0182977 A1* | 7/2012 | Hooli ................ | H04W 72/1278 370/336 |
| 2013/0223362 A1* | 8/2013 | Alfano .................. | H04W 72/04 370/329 |
| 2015/0264662 A1* | 9/2015 | Sahlin ............... | H04W 72/1289 370/280 |
| 2015/0271852 A1* | 9/2015 | Rahman ............ | H04W 28/0247 370/329 |

(Continued)

*Primary Examiner* — Will W Lin

(57) ABSTRACT

Embodiments herein provide a method of managing grant of resources to a plurality of user equipments in a wireless communication network. The state corresponds to idle UEs, upload UEs and download UEs. The method includes identifying a state of the plurality of UEs. Further, the method includes managing grant of resources to one or more of the upload UEs and the download UEs, based on an operational condition of the UEs in the wireless communication network.

10 Claims, 9 Drawing Sheets

(56) References Cited

U.S. PATENT DOCUMENTS

2015/0341927 A1* 11/2015 Wei ................... H04W 72/0446
370/280
2017/0318575 A1* 11/2017 Park .................. H04W 72/0413

* cited by examiner

METHOD OF MANAGING GRANT OF RESOURCES TO PLURALITY OF USER EQUIPMENTS IN WIRELESS COMMUNICATION NETWORK

TECHNICAL FIELD

The present invention relates to a wireless communication network and more particularly relates to a mechanism of managing grant of resources to a plurality of user equipments (UEs) in the wireless communication network. The present application is based on, and claims priority from an Indian Application Number 201641007735 filed on 4 Mar. 2016, the disclosure of which is hereby incorporated by reference.

BACKGROUND

Wireless communication network includes multiple base stations, each with a coverage area and serve multiple user equipments (UEs) within the coverage area. The UEs associates with the base stations and the communications between base stations and the UEs provide access capability to the UEs, and may be asymmetric, i.e., having different downlink and uplink data rates respectively.

In order to support higher data rates, wideband code division multiple access (WCDMA) network introduced high speed downlink packet access (HSDPA) and high speed uplink packet access (HSUPA) features. The HSDPA improves the downlink data transmission, whereas the HSUPA improves the uplink data transmission. In order to reduce the transmission delays, packet scheduling functionality is moved from a radio network controller (RNC) to the base stations called as MAC-hs in downlink side and MAC-e in uplink side. Further, the HSDPA introduces a downlink common channel (HS-DSCH) shared to all UEs (alternatively referred as users) whereas the HSUPA uses an enhanced dedicated channels (E-DCH) for each UE. In downlink, packet scheduling is performed through a round robin method based on parameters such as channel quality or the like. In the uplink, several scheduling mechanisms can be possible as the UEs can transmit in parallel with a low bit rate or the round robin method where few UEs can transmit with high rate based on priority, service type or channel quality and so on.

In a conventional method, the scheduling is performed in such a way that all the UEs can transmit in parallel with a low bit rate. The performance of this method depends on the receiver decoding capacity. The receiver capacity is calculated on the basis of maximum allowable 1% bit error rate (BER) (or 10% BLER), which defines the spreading factor with respect to number of users. As the number of users increases, the possible spreading factor (SF) also increases in order to reduce the inter-user interference. When a single user is in the system the higher grant is given to the user for better transport block and the maximum possible SF will be 2×SF2 for Category 4. Other possible transport blocks have 2×SF4 for category 4, SF4, SF8, SF16, SF32 and SF256 for category 1. For example, if a second user is added, both can go up to SF4 of category 1. This is closer to the single user capacity for category 2 2×SF4 configuration. So approximately 1.4 kbps cell throughput is possible. Similarly, every addition of user will further increase SF and reduces the user throughput in such a way that approximately cell throughput of 1.4 kbps can be maintained.

In another conventional method, few users can transmit with high bit-rate with Round Robin fashion which gives better cell throughput. Here, the inter-user interference is avoided drastically. In this method the average cell throughput is almost close to the cell throughput of single user case. In this case, if the user got scheduling but does not have activity, in such a case the overall cell throughput drops as user is not fully utilizing. In other certain conditions where different users experiencing different channel conditions the cell throughput can be further improved by prioritizing the user with best channel conditions. But this might cause the other users to stop getting resources as per their service type. This method does not work efficient in certain scenarios as user gets grant over scheduled period of interval which leads to delays in response which intern drops the cell throughput in both uplink and downlink side.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a mechanism for managing grant of resources to a plurality of user equipments (UEs) in a wireless communication network.

Accordingly the embodiments herein provide a method of managing grant of resources to a plurality of user equipments in a wireless communication network. The method includes identifying a state of the plurality of UEs. The state corresponds to idle UEs, upload UEs and download UEs. The method includes identifying a state of the plurality of UEs. Further, the method includes managing grant of resources to one or more of the upload UEs and the download UEs, based on an operational condition of the UEs in the wireless communication network.

Accordingly the embodiments herein provide a base station for managing grant of resources to a plurality of user equipments in a wireless communication network. The base station includes a state identification unit configured to identify a state of the plurality of UEs. The state corresponds to idle UEs, upload UEs and download UEs. Further, the scheduling unit is configured to manage grant of resources to at least one of the upload UEs and the download UEs, based on an operational condition of UEs in the wireless communication network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
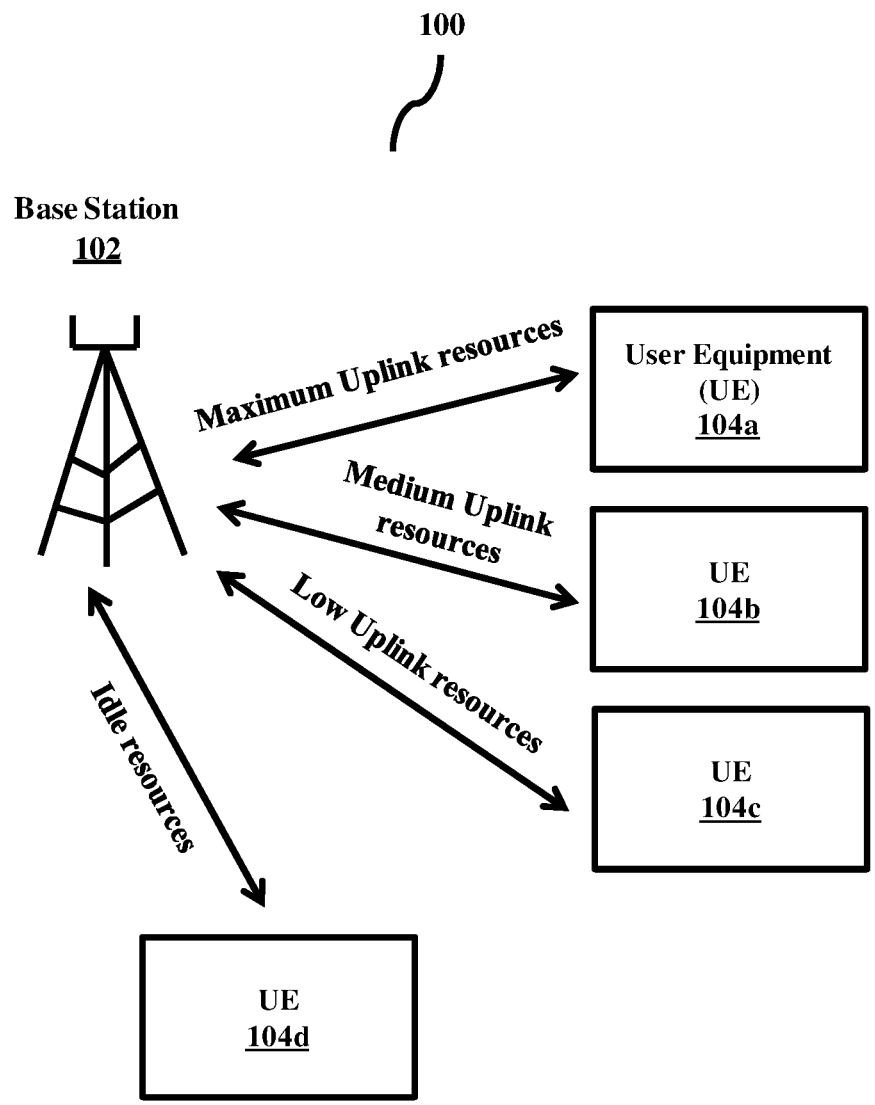
FIG. 1 illustrates an overview of a wireless communication network for managing grant of resources to a plurality of user equipments (UEs), according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the description, the terms users and User Equipments (UEs) are used interchangeably.

The embodiments herein achieve a method of managing grant of resources to a plurality of user equipments (UEs) in a wireless communication network. The method includes identifying a state of the plurality of UEs. The state corresponds to idle UEs, upload UEs and download UEs. Further, the method includes managing grant of resources to one or more of the upload UEs and the download UEs, based on an operational condition of the UEs in the wireless communication network.

In an embodiment, managing the grant of resources to one or more of the upload UEs and the download UEs includes allocating upload resources to upload UEs and download resources to download UEs and idle resources to Idle UEs. In an embodiment, the operational condition of the UEs corresponds to the present state of the UEs.

In an embodiment, the operational condition corresponds to change in state of UEs.

Unlike the conventional methods, the proposed method provides a mechanism for managing grant of resources to a plurality of UEs in the wireless communication network. The proposed method provides different access control (MAC-e) schedulers for scheduling the resources efficiently for handling both uploading and downloading in parallel along with very low uplink resources allocated to idle users statically. Each MAC-e scheduler uses a fixed grant at a time, thereby providing a constant power usage. Further, with the proposed method, the base station can adaptively grant resources based on the state of the UEs and the operational condition of the UEs leading to optimal grant of resources to the plurality of UEs.

Referring now to the drawings and more particularly to FIGS. 1 through 5d where similar reference characters denote corresponding features consistently throughout the figures, there are shown preferred embodiments.

FIG. 1 illustrates an overview of a wireless communication network 100 for managing grant of resources to a plurality of UEs, according to the embodiments as disclosed herein. As depicted in the FIG. 1, the wireless communication network 100 includes a base station and a plurality of UEs 104a, 104b, 104c and 104d (i.e., 104a-104d). In an example, the base station 102 can be an evolved node base station (eNodeB). In an example, the UEs (104a-104d) can be a mobile phone, a smart phone, a communication device, or the like.

The base station 102 communicates with the UEs 104a-104d in the coverage area of the base station 102. In an embodiment, the base station 102 manages grant of resources to the plurality of UEs 104a-104d in the coverage area.

In an embodiment, the base station 102 adaptively grants resources i.e., idle resources, Maximum uplink resources and Medium or Low uplink resources to the UEs 104a-104d. The base station 102 adaptively grants Maximum uplink resources to upload UEs and Medium or Low uplink resources to download UEs. The base station 102 includes scheduler for granting the resources of different types (not shown in the FIG. 1) respectively to the UEs 104a-104d.)

The method of managing grant of resources to the UEs 104a-104d is as described herein. Initially, each UE in the wireless network are allocated with zero grants. In an embodiment, the base station 102 is configured to identify the state of the UEs 104a-104d. The state of the UEs 104a-104d corresponds to idle UEs, upload UEs and download UEs. Further, the base station 102 is configured to manage grant of resources to the upload UEs and the download UEs based on an operational condition of UEs 104a-104d.

In an embodiment, the operational condition corresponds to present state of the UEs.

In an embodiment, the operational condition corresponds to change in state of the UEs.

In an embodiment, the base station 102 determines the operational state of each UE to adaptively grant resources to each UE.

In an embodiment, if the base station 102 identifies the present state of the UEs (i.e., the operational condition) as upload UEs, then the base station 102 grants maximum uplink resources to upload UEs in the absence of download UEs as determined by the base station 102.

In an embodiment, if the base station 102 identifies the present state of the UEs (i.e., the operational condition) as download UEs, then the base station 102 grants medium uplink resources. If there are more than one download user exists, one of the down load user obtains medium download resources in order, where as others get low uplink resources. If base station 102 identifies as Upload UE, then the base station 102 grants maximum uplink resources the upload UEs. If there are more than one Upload user exists, each of the upload user gets maximum uplink resources in order where as others get zero resources (very low uplink resources). If base station 102 identifies as Idle UE, then Idle resources are granted.

In an embodiment, if the base station 102 identifies the change of state of the UEs (i.e., the operational condition of the UEs is changed from the download UEs to the upload UEs), then the base station 102 grants maximum uplink resources to the upload UEs in the order of their scheduling.

In an embodiment, if the base station 102 identifies the change of state of the UEs (i.e., the operational condition of the UEs is changed from the upload UEs to the download UEs), the base station 102 grants medium uplink resources to download UEs in the order of their scheduling. Thus, the base station 102 manages the grant of maximum and medium or low uplink resources based on the operational condition of the UEs 104*a*-104*d* in the wireless communication network 100.

The FIG. 1 shows a limited overview of the wireless communication network 100, it should be understood that the other embodiments are not limited thereto. The wireless communication network 100 can include many components other than the UEs (104*a*-104*d*) and base station 102 shown in the FIG. 1.

Figure 2A:
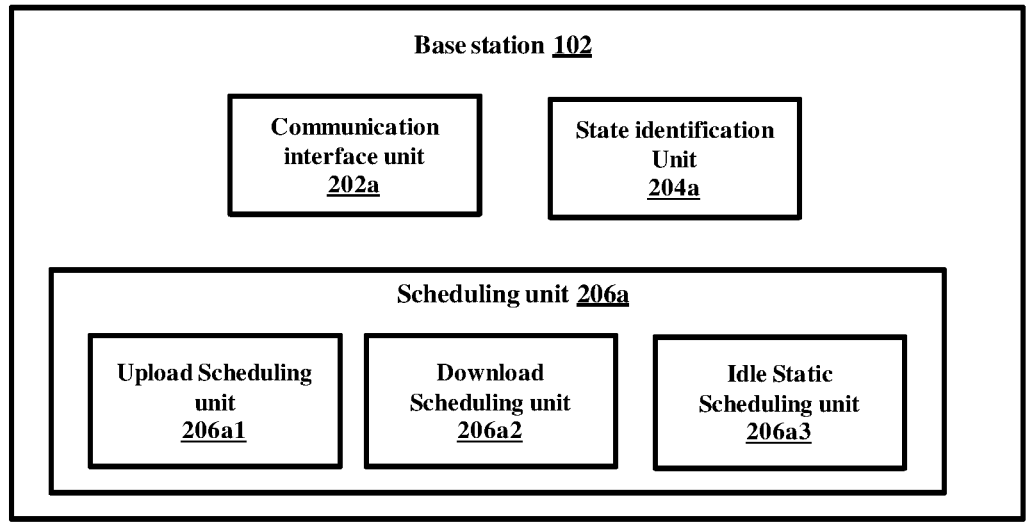
FIG. 2a illustrates various units of a base station in the wireless communication network described in the FIG. 1, according to the embodiments as disclosed herein.

FIG. 2*a* illustrates various units of a base station in the wireless communication network described in the FIG. 1, according to the embodiments as disclosed herein. In an embodiment, the base station 102 includes a communication interface unit 202*a*, a state identification unit 204*a* and a scheduling unit 206*a*, which includes an upload scheduling unit 206*a*1, a download scheduling unit 206*a*2 and idle static scheduling unit 206*a*3.

In an embodiment, the communication interface unit 202*a* is configured to facilitate communication with the UE 104*a*-104*d*.

In an embodiment, the state identification unit 204*a* is configured to identify the state of the plurality of UEs. In an embodiment, the state identification unit 204*a* is configured to identify the state of the plurality of UEs from scheduling information (SI), medium access control (MAC-hs) parameters or the like.

The scheduling unit 206*a* resides at physical layer (also known as layer 1) of the base station 102. In an embodiment, the scheduling unit 206*a* includes two MAC-e schedulers, which are the upload scheduling unit 206*a*1, the download scheduling unit 206*a*2 and the idle static scheduling unit 206*a*3.

In an embodiment, the upload scheduling unit 206*a*1 is configured to allocate Maximum uplink resources to the upload UEs, In an embodiment, the download scheduling unit 206*a*2 is configured to grant Medium or low uplink resources to the download UEs In an embodiment, the idle static scheduling unit 206*a*3 is configured to grant idle resources to the Idle UEs.

Figure 2B:
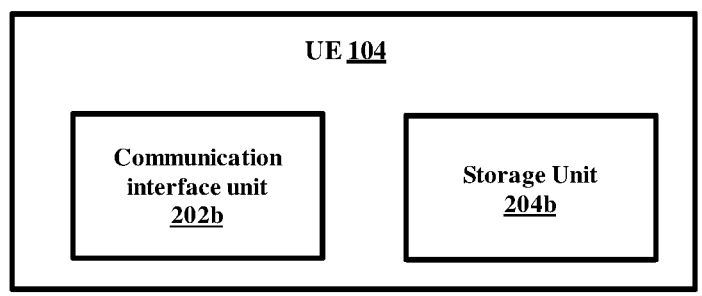
FIG. 2b illustrates various units of the UE in the wireless communication network described in the FIG. 1, according to the embodiments as disclosed herein.

FIG. 2*b* illustrates various units of the UE 104 in the wireless communication network described in the FIG. 1, according to the embodiments as disclosed herein. In an embodiment, the UE 104 includes a communication interface unit 202*b*, and a storage unit 204*b*.

In an embodiment, the communication interface unit 202*a* is configured to facilitate communication with the UE 104.

In an embodiment, the storage unit 204*b* includes data to be uploaded or downloaded to and from the base station 102. The storage unit 204*b* is a buffer for storing the data while the UE 104 is uploading or downloading. For example, an application running on the UE 104 can have data which is stored in the buffer. The data is stored in the buffer before uploading or downloading the data.

Figure 3:
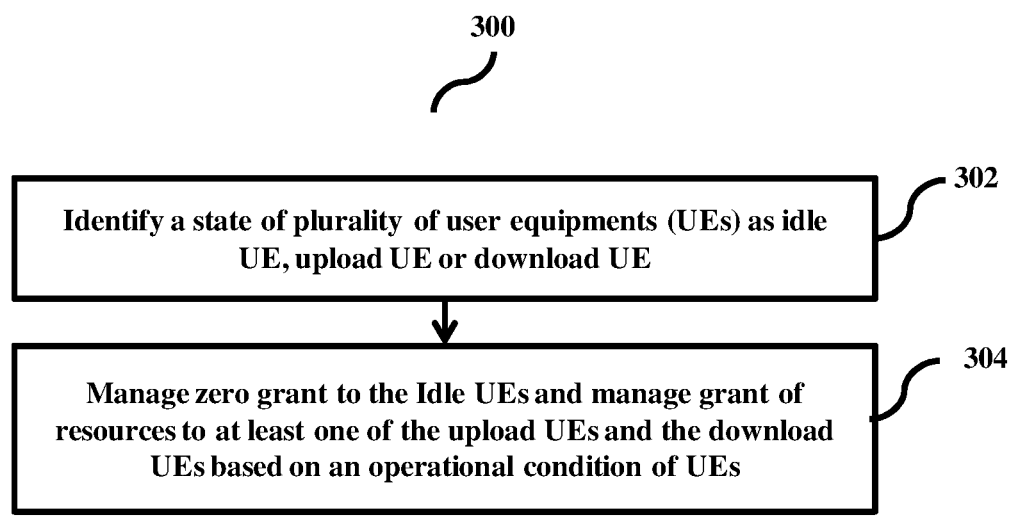
FIG. 3 is a flow diagram illustrating a method of managing grant of resources to the plurality of UEs in the wireless communication network.

FIG. 3 is a flow diagram illustrating a method 300 of managing grant of resources to the plurality of UEs. At step 302, the method 300 includes identifying the state of the plurality of UEs 104*a*-104*d* as idle UE, upload UE and download UE. The method 300 allows the state identification unit 204*a* to identify the state of the plurality of UEs 104*a*-104*d*. In an embodiment, the state corresponds to the idle UE, the upload UE and the download UE.

At step 304, the method 300 includes managing zero grant to idle UEs and managing grant of resources to one or more of the upload UEs and the download UEs based on the operational condition of UEs. The method 300 allows the scheduling unit 206*a* to manage zero grant to idle UEs and manage grant of resources to one or more of the idle UEs, the upload UEs and the download UEs based on the operational condition of UEs. In an embodiment, the upload scheduling unit 206*a*1 is configured to allocate maximum uplink resources to the upload UEs and the download scheduling unit 206*a*2 to grant medium or low uplink resources to the download UEs. The upload scheduling unit 206*a*1 is configured to allocate uplink resources based on the operational condition of the UEs 104*a*-104*d*. In an example, if the operational condition (i.e., the present state of the UE 104) of the UE 104*a* is determined as upload UE, then the upload scheduling unit 206*a* is configured to allocate maximum uplink resources to the UE 104*a*.

In an example, if the operational condition (i.e., the change in state of the UE 104*a*) is determined as download state to upload state, then the upload scheduling unit 206*a*1 is configured to allocate maximum uplink resources to the UE 104*a*.

The download scheduling unit 206*a*2 is configured to allocate medium or low uplink resources based on the operational condition of the UEs 104*a*-104*d*. In an example, if the operational condition (i.e., the present state of the UE 104) of the UE 104*a* is determined as download UE, then the download scheduling unit 206*a*2 is configured to allocate medium or low uplink resources to the UE 104*a*.

In an example, if the operational condition (i.e., the change in state of the UE 104*a*) is determined as upload state to download state, then the download scheduling unit 206*a*1 is configured to allocate medium uplink or low uplink resources to the UE 104*a*. Thus, the base station 102 manages the grant of resources to the plurality of UEs 104*a*-104*d* based on the operational state of the UEs 104*a*-104*d*. Various example illustrations for managing the grant of resources to the plurality of UEs 104*a*-104*d* is explained in conjunction with the FIGS. 4*a*-4*e*.

Consider a scenario, where a user is downloading an image from a messenger application on the UE 104*a*. In order to download the image, the base station 102 allocates either medium grant or Low grant for the UE 104*a*. Further, while downloading the image, the UE 104*a* periodically transmits acknowledgement messages to the base station 102. Thus, the base station 102 allocates at least low grant resources for the UE 104*a* in order to transmit the acknowledgment messages.

FIGS. 4*a*-4*e* is example illustrations in which the resources are granted among the plurality of UEs in the wireless communication network. In the FIG. 4*a*, the user 1 is uploading and the user 2 is idle. When the user 1 is uploading, the base station 102 grants maximum uplink resources (i.e., maximum available grant (Max AG)) as shown in the FIG. 4*a*. For the user 2, the resources are not granted as the user 2 is idle. The base station 102 sends Zero grant, which means that an enhanced transport format combination indicator 0 (ETFCI 0) to the user 2 as shown in the FIG. 4*a*.

Figure 4A:
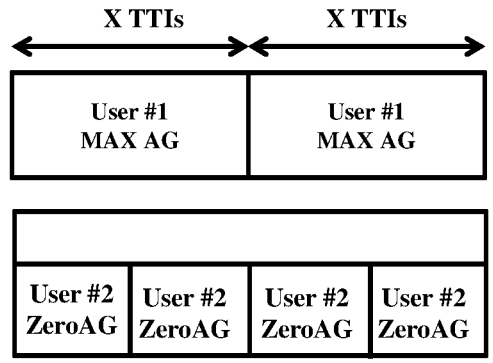
FIGS. 4a-4e are example illustrations in which the resources are granted among the plurality of UEs in the wireless communication network.
Figure 4B:
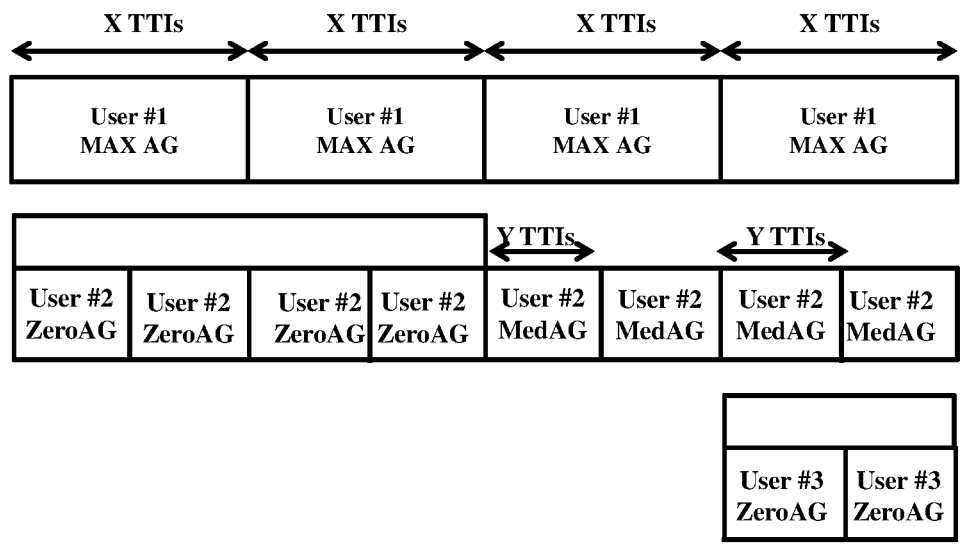

In the FIG. 4b, the user 2 starts downloading and a user 3 is added and the user 3 remains idle. In this case, the base station 102 identifies the change of state of the user 2 (i.e., from idle state to download state). When the change of state of user 2 is identified, the base station 102 grants the medium available grant (MedAG) resources to the user 2 as shown in the FIG. 4b. Further, the user 1 is granted with MaX AG as the user 1 is uploading. Furthermore, as the user 3 remains idle, the resources are not granted. The base station 102 sends Zero grant (ETFCI 0) to the user 2 as shown in the FIG. 4b.

Figure 4C:
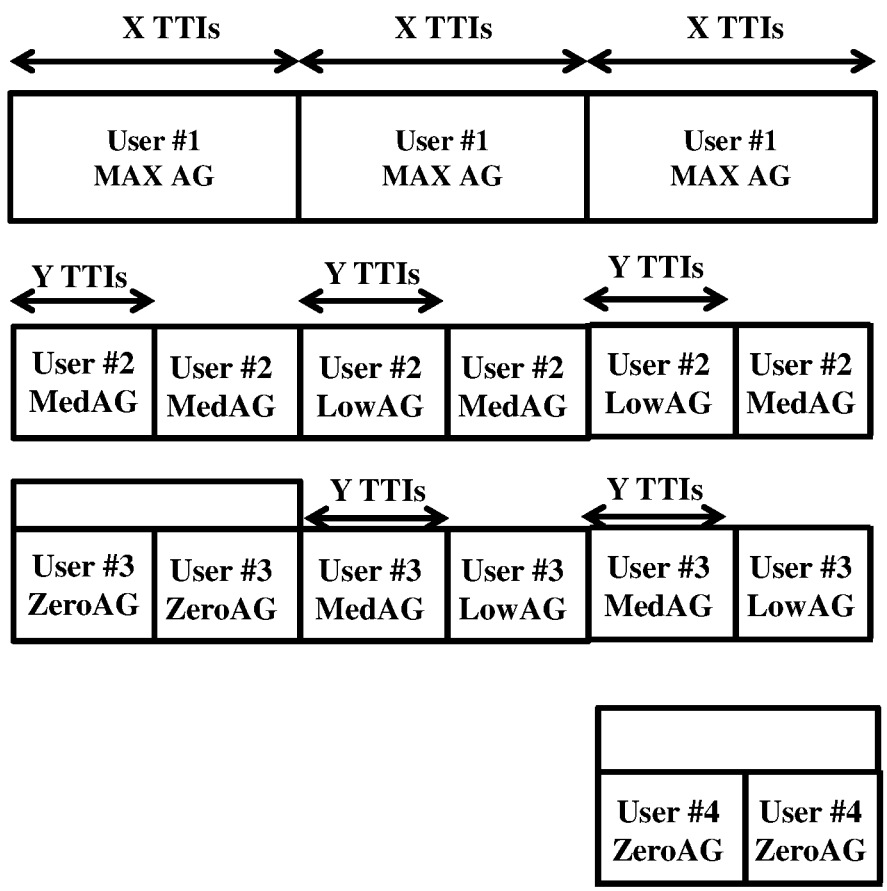

In the FIG. 4c, user 3 starts downloading and a user 4 is added and the user 4 remains idle. In this case, the base station 102 identifies the change of state of the user 3 (i.e., from idle state to download state). When the change of state of user 3 is identified, the base station 102 grants the medium available grant (MedAG) to the user 3 as shown in the FIG. 4c. When the user 3 is granted with MedAG, the base station 102 allocates low available grant (LowAG) to the user 2. In an embodiment, the base station 102 switches the grants (i.e., the MedAG and the LowAG) between the user 3 and user 2 at periodic time intervals as shown in the FIG. 4C. Further, the user 1 is granted with MaXAG as the user 1 is uploading. Furthermore, as the user 4 remains idle. The base station 102 sends Zero grant (the ETFCI 0) to the user 4 as shown in the FIG. 4c.

Figure 4D:
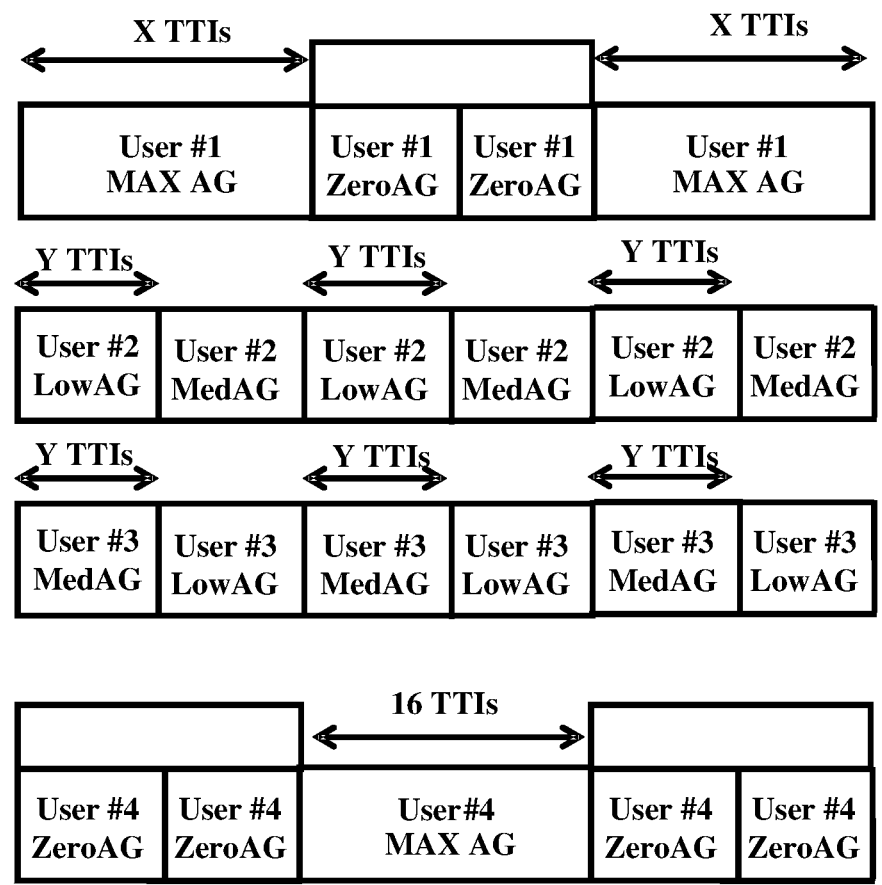

In the FIG. 4d, the user 4 starts uploading. In this case, the base station 102 identifies the change of state of the user 4 (i.e., from idle state to upload state). When the change of state of user 4 is identified, the base station 102 grants the MaxAG resources to the user 4 as shown in the FIG. 4d. Further, the user 1 is granted with Max AG as the user 1 is uploading. When the user 1 is granted with MaxAG, the base station 102 switches the MaxAG between the user 4 and user 1 at periodic time intervals as shown in the FIG. 4d. Furthermore, the base station 102 switches the grants (i.e., the MedAG and the LowAG) between the user 3 and user 2 at periodic time intervals as shown in the FIG. 4d.

Figure 4E:
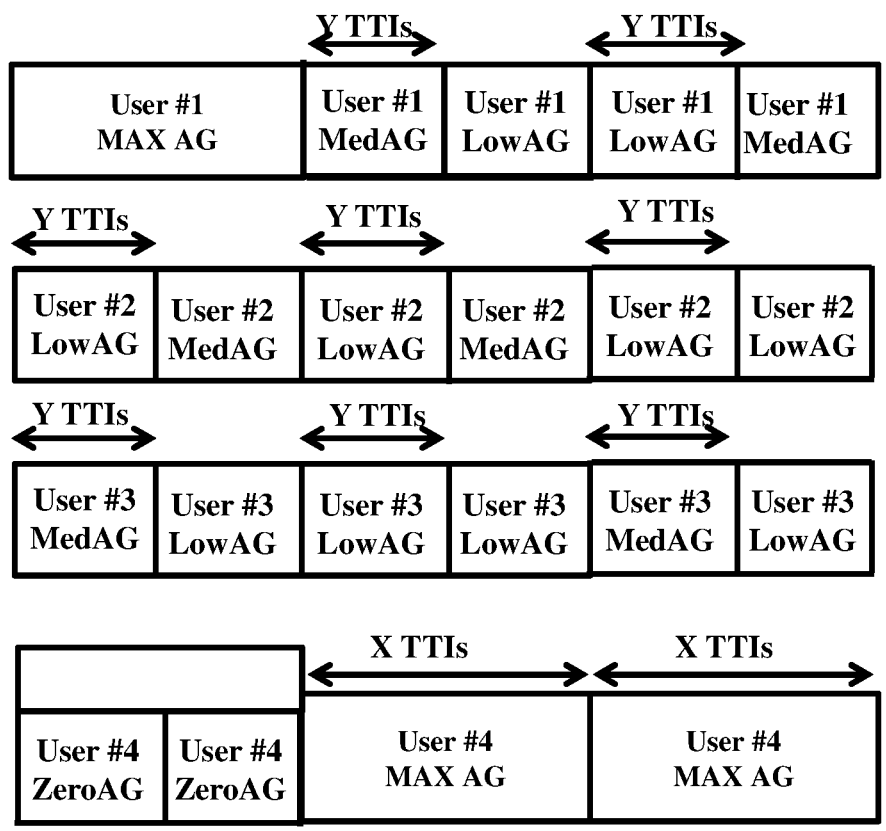

In the FIG. 4e, the user 1 starts downloading. In this case, the base station 102 identifies the change of state of the user 1 (i.e., from upload state to download state). When the change of state of user 1 is identified, the base station 102 grants the MedAG resources to the user 1 as shown in the FIG. 4e. When the user 1 is granted with MedAG, the base station 102 switches the MedAG between the user 1, the user 2 and the user 3 at periodic time intervals as shown in the FIG. 4e. Further, the base station 102 grants MaxAG to the user 4 as the user 4 is uploading as shown in the FIG. 4e.

FIGS. 5a-5d is another example illustration in which the base station 102 manages grant of resources among the plurality of UEs, according to the embodiments as disclosed herein. As depicted in the FIG. 5a, when the UE 104a is identified as the upload UE, the base station 102 grants the MaxAG to the UE 104a. When the UE 104b is identified as the upload UE, the base station 102 grants the MaxAG to the UE 104b after the periodic time interval (as determined by the base station). As shown in the FIG. 5a, the UE 104a and the UE 104b periodically utilizes the MaxAG granted by the base station for uploading. In an example, the UE 104a utilizes the MaxAG for 10 milliseconds and remains idle for a time interval. Further, the UE 104b utilizes the MaxAG for 10 milliseconds and remains idle for the time interval. Thus, the MaxAG is shared between the UEs 104a and 104b for uploading. Furthermore, the UE 104c remains idle when the UEs 104a and 104b are uploading as shown in the FIG. 5a.

Figure 5A:
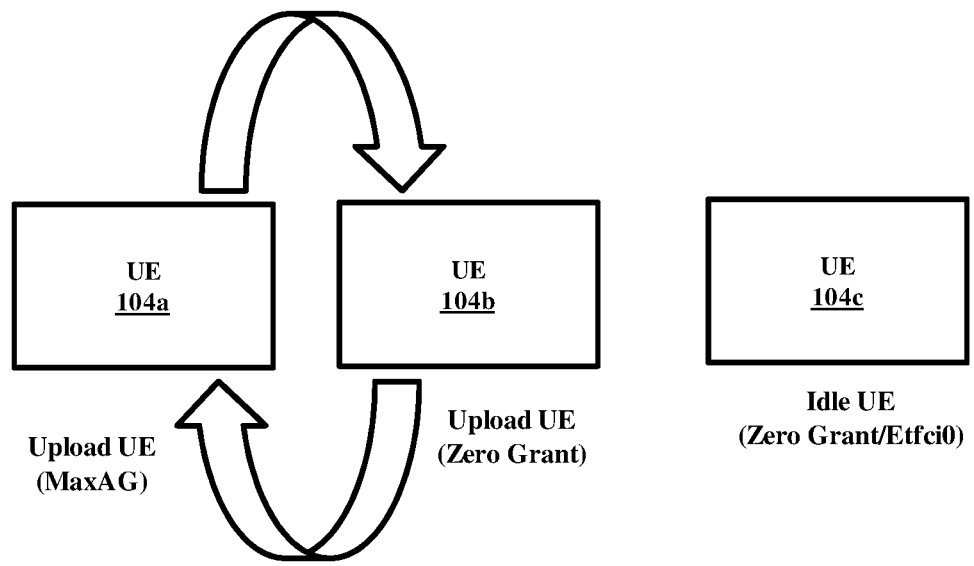
FIGS. 5a-5d is another example illustration in which the base station manages grant of resources among the plurality of UEs, according to the embodiments as disclosed herein.
Figure 5B:
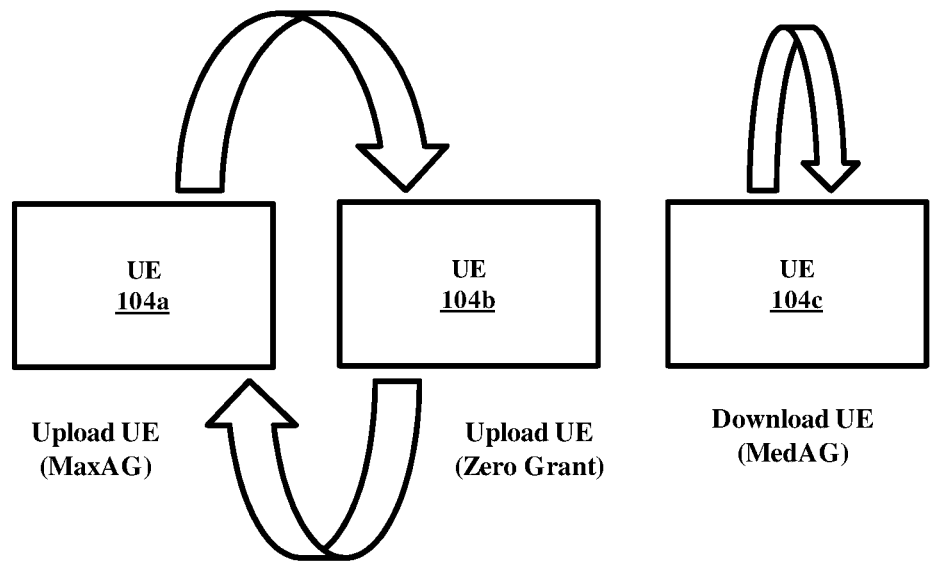

As depicted in the FIG. 5b, when the UEs 104a and 104b are uploading, the UE 104c starts downloading. The base station 102 identifies the change in the state of the UE 104c (i.e., from idle state to downloading state). When the base station 102 identifies the change in state of the UE 104c, the base station 104c grants MedAG to the UE 104c as shown in the FIG. 5b.

Figure 5C:
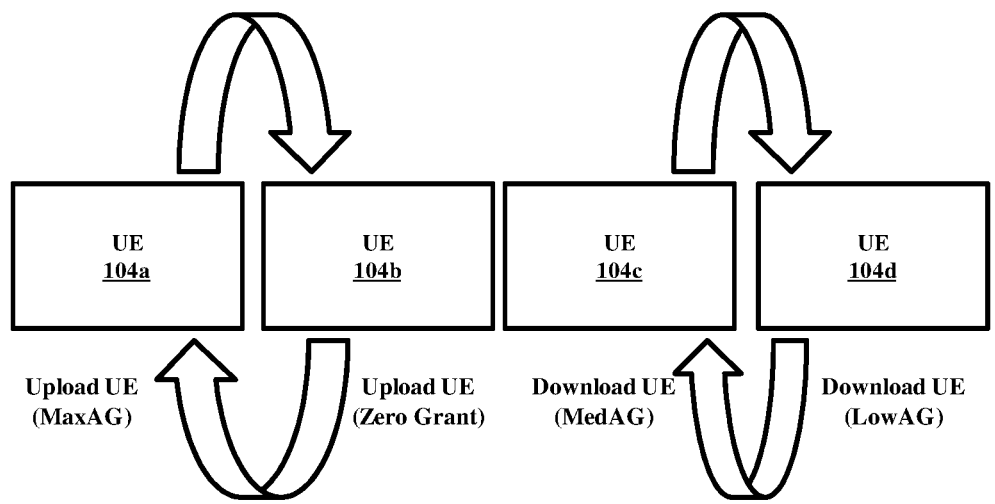

As depicted in the FIG. 5c, when the UEs 104a and 104b are uploading, and the UE 104c is downloading, the UE 104c starts downloading. In this case, the base station 102 grants the LowAG to the UE 104d. Further, the MedAG is allocated to the UE 104c and the LowAG is allocated to the UE 104d are exchanged by the UEs 104c and 104d, as configured by the base station 102.

Figure 5D:
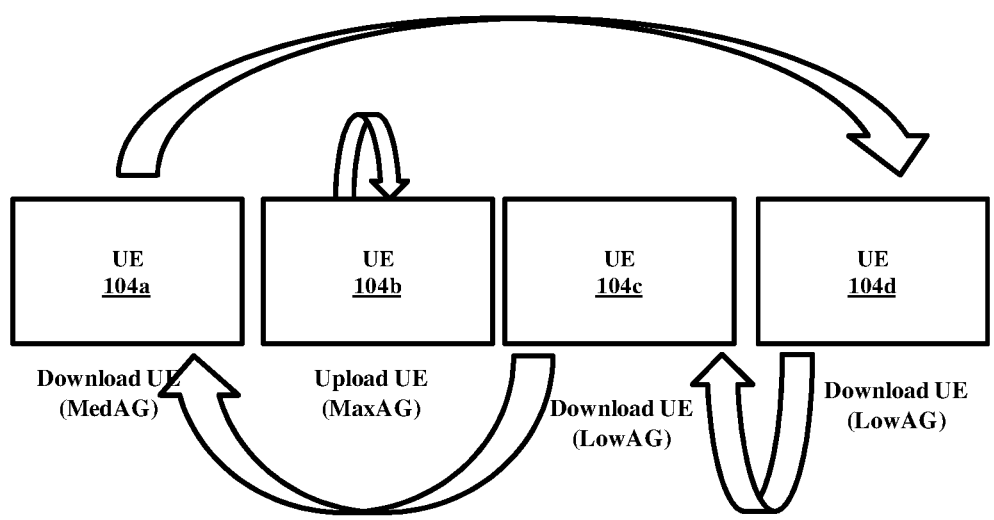

As depicted in the FIG. 5d, the UE 104a starts downloading while the UE 104b is uploading and the UEs 104c and 104d are downloading. In this case, the base station 102 identifies the change in state of the UE 104a (i.e., from state of uploading to downloading. Further, the base station 102 grants MedAG to the UE 104a. Further, the LowAG is allocated to the UE 104c and UE 104d are exchanged by the UEs 104a, 104c and 104d, as configured by the base station 102.

Although other example illustrations are not described, it should be understood that the embodiments described herein are limited. It is to be understood that the base station 102 adaptively manages the grant of resources (i.e., the maximum uplink resources to the upload UEs and the medium or low resources to the download UEs). In an embodiment, the upload scheduling unit 206a1 is configured to allocate maximum uplink resources to the upload UEs and the download scheduling unit 206a2 to grant Medium or Low uplink resources to the download UEs. The upload scheduling unit 206a1 is configured to allocate uplink resources based on the operational condition of the UEs 104a-104d. In an example, if the operational condition (i.e., the present state of the UE 104) of the UE 104a is determined as upload UE, then the upload scheduling unit 206a is configured to allocate maximum uplink resources to the UE 104a.

Further, the base station 102 manages the grant of resources to the UEs which start uploading or downloading instantaneously in the wireless communication network.

The proposed method is implemented and tested against various scenarios. MaxAG, MedAG, LowAG and ZeroAG are not fixed values, can be tuned based on the scenarios. For a window of 20 transmission time intervals (TTIs) used for managing resources to uploading UEs and a window of 10 TTIs is used for managing resources to download UEs which are termed as X and Y. In the implemented system, MaxAG, MedAG, LowAG and ZeroAG are 28, 15, 12 and 7 respectively. In order to decode SI, Idle users are given grant of 7 corresponds to ETFCI 0. Based on the operational condition and received power these values can be tuned further to achieve better throughput.

The throughput values in various scenarios are provided, where the UEs are uploading with combination of other UEs which are either downloading or idle. The category 4 with 10 ms TTI is used for the below table 1.

TABLE 1

| | No. of Idle users | No. of Download users | No. of Upload users | Uplink Cell Throughput |
|---|---|---|---|---|
| 1 | 0 | 0 | 1 | 1.995 Mbps |
| 2 | 7 | 0 | 1 | 1.995 Mbps |
| 3 | 0 | 0 | 8 | 1.696 Mbps |

TABLE 1-continued

| No. of Idle users | No. of Download users | No. of Upload users | Uplink Cell Throughput |
|---|---|---|---|
| 4 | 0 | 1 | 2.267 Mbps |
| 5 | 0 | 7 | 1 | 2.045 Mbps |
The embodiments disclosed herein can be implemented through at least one software program running on at least one hardware device and performing network management functions to control the elements. The elements shown in the FIGS. 1 through 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of managing grant of resources to a plurality of user equipments (UEs) in a wireless communication network, the method comprising:
    identifying, by a base station, a state of said plurality of UEs, wherein said state corresponds to idle UEs, upload UEs, download UEs; and
    managing, by said base station, grant of resources to at least one of said upload UEs and said download UEs, based on an operational condition of UEs in the wireless communication network, wherein managing grant of resources to said upload UEs and said download UEs includes at least one of:
        allocating maximum uplink resources to at least one upload UE from said upload UEs and allocating medium uplink resources to at least one download UE from said download UEs.

2. The method of claim 1, wherein managing grant of resources includes adaptively grant at least one of: upload resources to said upload UEs, and download resources to said download UEs.

3. The method of claim 1, wherein said operational condition refers to one of a present state of said UEs, change of state of said UEs.

4. The method of claim 1, wherein managing grant of resources to said upload UEs includes allocating maximum uplink resources to said upload UEs in response to determining that absence of said download UEs.

5. The method of claim 1, wherein managing grant of resources to said upload UEs includes allocating medium uplink resources to said at least one download UE from said download UEs in response to determining the absence of said upload UEs.

6. A base station for managing grant of resources to a plurality of user equipments in a wireless communication network, the base station comprising a scheduling unit and is configured to:
    identify a state of said plurality of UEs, wherein said state corresponds to idle UEs, upload UEs and download UEs;
    wherein said scheduling unit is configured to manage grant of resources to at least one of said upload UEs and said download UEs, based on an operational condition of said UEs in the wireless communication network, wherein said scheduling unit configured to manage grant of resources to said upload UEs and said download UEs includes at least one of:
        allocating maximum uplink resources to at least one upload UE from said upload UEs and allocating medium uplink resources to at least one download UE from said download UEs.

7. The base station of claim 6, wherein said scheduling unit is configured to manage said grant of resource by:
    adaptively grant at least one of: maximum uplink resources to said upload UEs, and medium uplink resources to said download UEs.

8. The base station of claim 6, wherein said operational condition refers to one of a present state of said UEs, change of state of said UEs.

9. The base station of claim 6, wherein said scheduling unit is configured to manage said grant of resource by:
    allocating maximum uplink resources to said upload UEs in response to determining that absence of said download UEs.

10. The base station of claim 6, wherein said scheduling unit is configured to manage said grant of resource by:
    allocating medium uplink resources to at least one said download UE in response to determining that absence of said upload UEs.

* * * * *